(12) United States Patent
Yasukawa

(10) Patent No.: US 6,290,318 B1
(45) Date of Patent: Sep. 18, 2001

(54) COLOR PRINTER SYSTEM FOR CORRECTING COLORS DEPENDING ON COLOR OF PAPER

(75) Inventor: Kiyoshi Yasukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/141,722

(22) Filed: Aug. 27, 1998

(30) Foreign Application Priority Data

Aug. 27, 1997 (JP) ..................................... 9-246032

(51) Int. Cl.⁷ ................. B41J 29/38; B41J 2/21; B41J 2/165
(52) U.S. Cl. ................. 347/16; 347/14; 347/43; 347/23
(58) Field of Search ................. 347/16, 43, 14, 347/5, 9, 104, 23; 395/102, 101

(56) References Cited

U.S. PATENT DOCUMENTS 5,504,506 * 4/1996 Noaki ..................... 347/16

FOREIGN PATENT DOCUMENTS

| | | |
|---|---|---|
| 60167571 | 8/1985 | (JP) . |
| 60263153 | 12/1985 | (JP) . |
| 6281186 | 4/1987 | (JP) . |
| 62279950 | 12/1987 | (JP) . |
| 62296168 | 12/1987 | (JP) . |
| 211355 | 1/1990 | (JP) . |
| 21351 | 1/1990 | (JP) . |
| 2 112 961 A * | 4/1990 | (JP) ..................................... 347/225 |
| 2280572 | 11/1990 | (JP) . |
| 36174 | 1/1991 | (JP) . |
| 3277569 | 12/1991 | (JP) . |
| 6 206 349 A * | 7/1994 | (JP) ..................................... 347/43 |
| 9-44132 | 2/1997 | (JP) . |

* cited by examiner

Primary Examiner—John Barlow
Assistant Examiner—Charles W. Stewart, Jr.
(74) Attorney, Agent, or Firm—Foley & Lardner

(57) ABSTRACT

A color printer system for executing color printing of a color image object on various kinds of papers, comprises paper color characteristic reading unit to detect color characteristic of a printing surface of a paper to be used in printing, color converting unit to perform color conversion processing of the color image object corresponding to the color characteristic of the paper obtained by the paper color characteristic reading unit, and printing unit to execute color printing based on the printing data processed by the conversion of the color converting unit.

14 Claims, 5 Drawing Sheets

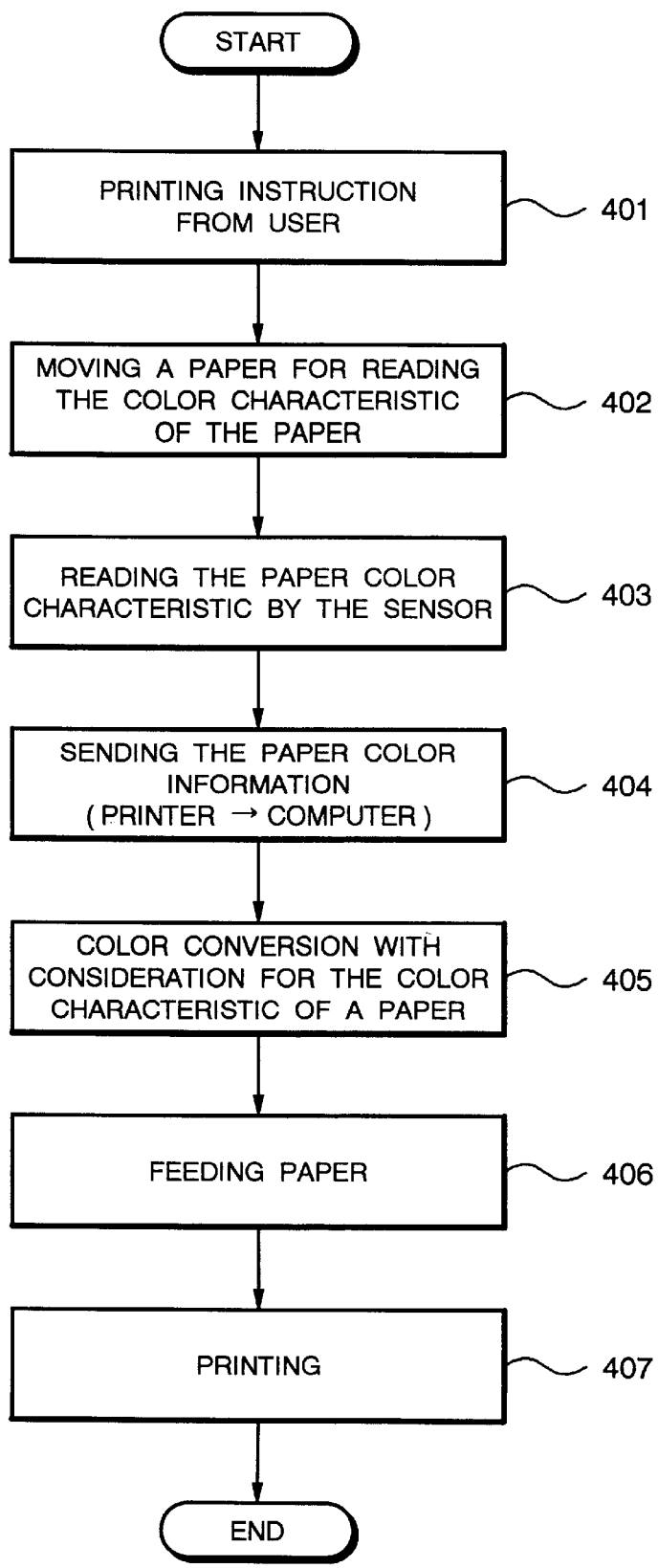

COLOR PRINTER SYSTEM FOR CORRECTING COLORS DEPENDING ON COLOR OF PAPER

BACKGROUNDS OF THE INVENTION

1. Field of the Invention

The present invention relates to a color printer system for executing color printing on a paper, and more particularly, to a color printer system for correcting color so as to be printed in a proper hue depending on the color of the paper.

2. Description of the Related Art

When displaying a color image object on a display or printing it out, the actually output hue of the image varies according to an output device, even if the color image object is the identical. This is caused by a difference of the color gamut (color space) in an output device, for example, a display or a printer. Then, there have been proposed various kinds of image output devices having a color correcting function with consideration for a difference of color space in an output device.

These conventional image output devices include a device disclosed in, for example, Japanese Patent Publication Laid-Open (Kokai) No. Heisei 9-44132 "Image Output Device". This publication discloses an image output device, with the data including a plurality of image objects stored therein, capable of automatically interlocking color treatment for the other image object associated with the specified image object when specifying the optimum color treatment for a given image object.

Provided with a function of correcting colors depending on an output device, however, the above mentioned conventional image output device gives no consideration to the color of a paper on which a color image is printed, in color printing. Therefore, the hue of the actually printed image may be different from the expected hue.

There are various kinds of papers for use in printout. For example, a white paper ranges from a truer white paper to a creamy white paper such as a recycled paper or a post card. Depending on the necessity, a color image may be printed on a colored paper. Therefore, a function of correcting colors of an image depending on the color of a paper is being desired.

SUMMARY OF INVENTION

An object of the present invention is to provide a color printer system capable of obtaining color printing results of an adequate hue by correcting colors of an image depending on the color of a paper.

According to one aspect of the invention, a color printer system for executing color printing of a color image object on various kinds of papers, comprises paper color characteristic reading means for detecting color characteristic of a printing surface of a paper to be used in printing, color converting means for performing color conversion processing of the color image object according to the color characteristic of the paper obtained by the paper color characteristic reading means, and printing means for executing color printing based on the color image object processed by the conversion of the color converting means.

In the preferred construction, the color printer system further comprises color characteristic information storing means for storing information on the color characteristic of the paper obtained by the paper color characteristic reading means, wherein the color converting means performs the color conversion processing of the color image object by use of the color characteristic information read out from the color characteristic information storing means when the color characteristic of a printing surface of a paper to be used in printing is stored in the color characteristic information storing means.

In another preferred construction, the color converting means performs the color conversion processing of the color image object based on said color characteristic of the paper and color characteristic of the printing means.

In another preferred construction, the color printer system further comprises color characteristic information storing means for storing information on the color characteristic of the paper obtained by the paper color characteristic reading means, wherein said color converting means reads out read out from said color characteristic information storing means when the color characteristic of a printing surface of the paper to be used in printing is stored in the color characteristic information storing means, and performs the color conversion processing of the color image object by using the color characteristic information and color characteristic of the printing means.

In another preferred construction, the paper color characteristic reading means is an optical sensor for detecting the color characteristic by receiving the reflection of a light irradiated on a paper.

In another preferred construction, the color printer system further comprises color characteristic information storing means for storing information on the color characteristic of said paper obtained by the paper color characteristic reading means, wherein the paper color characteristic reading means is an optical sensor for detecting said color characteristic by receiving the reflection of a light irradiated on the paper, and the color converting means performs the color conversion processing of the color image object by use of the color characteristic information read out from the color characteristic information storing means when the color characteristic of a printing surface of a paper to be used in printing is stored in the color characteristic information storing means.

Preferably, the paper color characteristic reading means is a scanner for optically scanning a printing surface of a paper.

Also, the color printer system further comprises color characteristic information storing means for storing information on the color characteristic of the paper obtained by the paper color characteristic reading means, wherein the paper color characteristic reading means is a scanner for optically scanning a printing surface of a paper, and the color converting means performs the color conversion processing of the color image object by use of the color characteristic information read out from the color characteristic information storing means when the color characteristic of a printing surface of a paper to be used in printing is stored in the color characteristic information storing means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a flow chart showing the operation of the embodiment;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
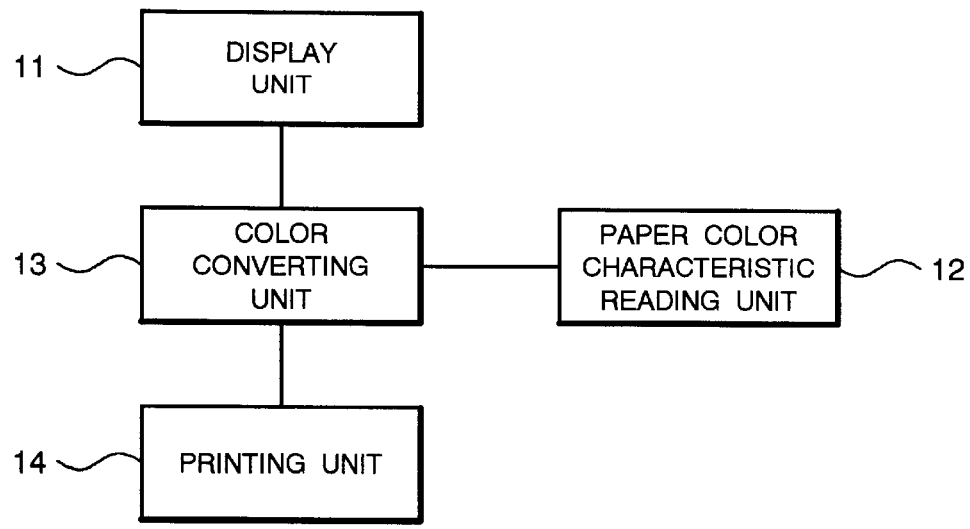
FIG. 1 is a block diagram showing the schematic structure of a color printer system according to the present invention.

As schematically illustrated in FIG. 1, a color printer system of the present invention has a fundamental structure including a display unit 11 for use in checking an image object, a paper color characteristic reading unit 12 for reading color characteristic of a paper to be set on the printer system, a color converting unit 13 for correcting colors of an image object depending on the result read by the paper color characteristic reading unit 12, and a printing unit 14 for printing out the image object whose colors have been corrected. Hereinafter, the embodiment will be described more concretely.

Figure 2:
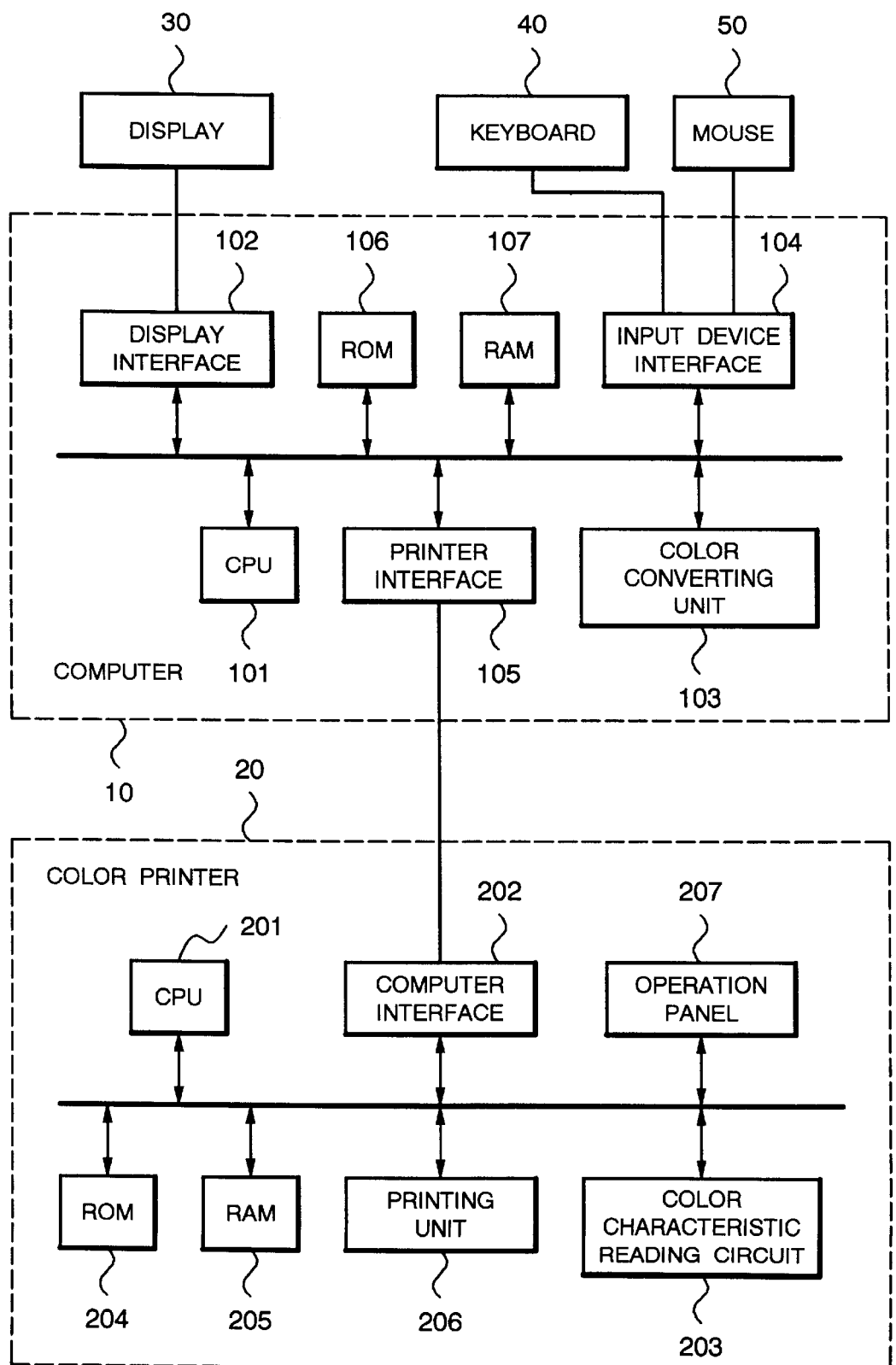
FIG. 2 is a block diagram showing the structure of a color printer system according to an embodiment of the present invention.

FIG. 2 is a block diagram showing the structure of a color printer system according to an embodiment of the present invention. With reference to FIG. 2, the color printer system of the embodiment comprises a computer 10 for controlling the whole system, a color printer 20 for printing out an image object, a display 30 for displaying an image object, a keyboard 40 and a mouse 50 for entering various data and commands. A user instructs the color printer 20 to print an image object by a given operation with the keyboard 40 and the mouse 50 while watching the display 30 with the image object to be printed displayed thereon. FIG. 2 shows the characteristic components of the embodiment, and the description of the other general components is omitted there.

As illustrated in FIG. 2, the computer 10 comprises a processor (CPU) 101 for controlling the operation of the system, a display interface 102 connected to the processor 101 through a data bus and a control bus, a color converting unit 103, an input device interface 104, a printer interface 105, and a read-only memory (ROM) 106 and a random-access memory (RAM) 107 for storing programs and data.

The processor 101 is respectively connected with the display 30 through the display interface 102, with the keyboard 40 and the mouse 50 through the input device interface 104, and with the color printer 20 through the printer interface 105.

The color converting unit 103 performs color conversion processing on the color signals of an image object displayed on the display 30, in consideration of the color characteristic of a device and the color characteristic of a paper set on the color printer 20, as mentioned below.

The color printer 20 comprises a processor (CPU) 201 for controlling printing operation, a computer interface 202 connected to the processor 201 through a data bus and a control bus, a color characteristic reading sensor 203, a ROM 204 and a RAM 205 for storing programs and data, an output device 206 for executing printing on a paper, and an operation panel 207 for performing necessary setting.

The computer interface 202 is connected to the printer interface 105 of the computer 10 via a cable and the both can be bidirectionally communicated to each other.

The color characteristic reading sensor 203 is a color photo sensor for detecting the color characteristic of a paper set on the color printer 30. For example, the surface of a paper is irradiated by a reference light and the reflection is converted into electric signals expressed by the density in accordance with the color components of cyan (C), magenta (M), and yellow (Y).

The output device 206 is a device for carrying a paper and printing data on a paper according to the printing data. For example, in case of a laser printer, the output device 206 may be a laser, a photosensitive material, and the other device for executing the electrophotographic process, and in case of a ink jet printer, it may be an ink jet head, and the other driving device. The color characteristic reading sensor 203 may be provided in the output device 206 at a proper position, for example, on a head portion or on a carrying route of a paper, thereby detecting the color characteristic of a paper associated with the operation of the output device 206.

In FIG. 2, the display 30 corresponds to the display unit 11 shown in FIG. 1, the color characteristic reading sensor 203 corresponds to the paper color characteristic reading unit 12 shown in FIG. 1, the color converting unit 103 corresponds to the color converting unit 13 shown in FIG. 1, the color printer 20, especially the output device 206 corresponds to the printing unit 14 shown in FIG. 1.

Figure 3:
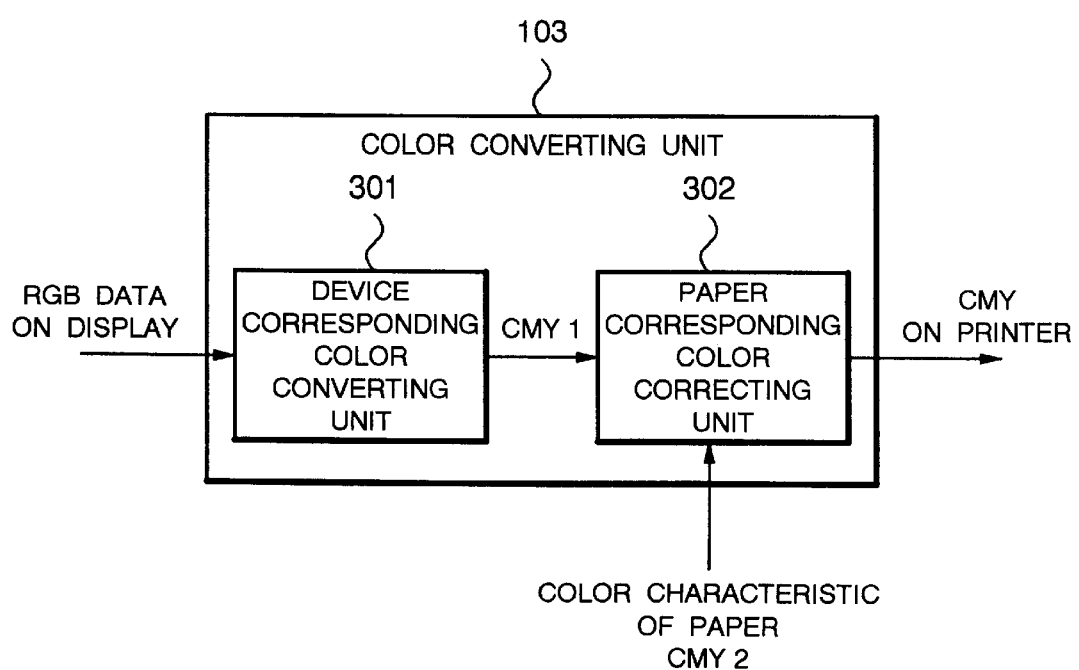
FIG. 3 is a functional block diagram showing the structure of a color converting unit according to the embodiment.

FIG. 3 is a functional block diagram showing the structure of the color converting unit 103. With reference to FIG. 3, the color converting unit 103 includes a device corresponding color converting unit 301 for performing the color conversion processing with consideration for the type of a device such as the display 30 or the color printer 20 and a paper corresponding color correcting unit 302 for correcting color with consideration for the color characteristic of a paper.

The device corresponding color converting unit 301 converts an RGB signal of an image object displayed on the color display 30 into a color signal CMY1 with consideration for printing by a printer. Since the processing of the device corresponding color converting unit 301 is of the conventional technique, the description thereof is omitted.

The color signal CMY1 obtained by the device corresponding color converting unit 301 is sent to the paper corresponding color correcting unit 302, where the color correction is performed in consideration of the color characteristic of a paper. Namely, the paper corresponding color correcting unit 302 corrects the color signal CMY1 by use of the color characteristic signal CMY2 of a paper obtained by the color characteristic reading sensor 203 and sends the obtained correct color signal CMY to the color printer 20.

For example, assuming that the respective color values of the color signal CMY1 obtained by the device corresponding color converting unit 301 are C1, M1, and Y1 and the respective color values of the paper color characteristic signal CMY2 are C2, M2, and Y2, the respective color values of the correct color signal CMY obtained by the paper corresponding color correcting unit 302 are C1−f (C2), M1−f (M2), and Y1−f (Y2). Here, f(*) is the function relative to the attribute of a paper, which is decided depending on the quality and the type of a paper. For example, when C1=150, M1=222, Y1=90, C2=10, M2=5, and Y2=18 in case of f(x)=x, the respective color values of the correct color signal become 140, 217 and 72. In this way, a color signal is corrected according to the color characteristic of a paper, thereby always executing the color printing of a proper hue without being affected by the color of a paper.

This time, the operation of the embodiment will be described with reference to the flow chart of FIG. 4. With reference to FIG. 4, a user operates the keyboard 40 or the mouse 50 at first, so as to enter a printing instruction of an image object displayed on the display 30 (Step 401). The processor 101 of the computer 10 issues a paper color characteristic acquiring instruction to the color printer 20 through the printer interface 105.

The processor 201 of the color printer 20, upon receipt of the paper color characteristic acquiring instruction output from the computer 10, moves a paper so as to read the color characteristic thereof through a control of the output device 206 (Step 402). Then, the color characteristic reading sensor 203 reads out the color characteristic of the paper (Step 403). The color characteristic signal CMY2 read out is returned to the computer 10 through the computer interface 202 as a reply to the color characteristic acquiring instruction (Step 404).

The color converting unit 103 of the computer 10 performs the color conversion processing with consideration for the paper color characteristic by use of the color characteristic signal CMY2 sent from the printer 20, as mentioned above (Step 405). When the color signal CMY thus obtained is sent from the computer 10 to the color printer 20 as the printing data, the processor 201 of the color printer 20 controls the output device 206 so as to feed the paper (Step 406) and performs printing on the paper according to the received printing data (Step 407).

The color converting unit 103 may be provided in the color printer 20, not in the computer 10. In this case, it is not necessary to send the paper color characteristic signal read by the sensor 203 to the computer 10, but the same signal can be used in the color converting unit of the color printer 20, so to perform an adequate color correction.

Further, a proper storing means may be provided in the system so as to store the information relative to the color characteristic of a paper having been once read. If a user knows the type of a paper, color correction by use of the stored color characteristic information can save the operation to be performed in every printing for acquiring color characteristic, thereby improving efficiency in printing.

Figure 5:
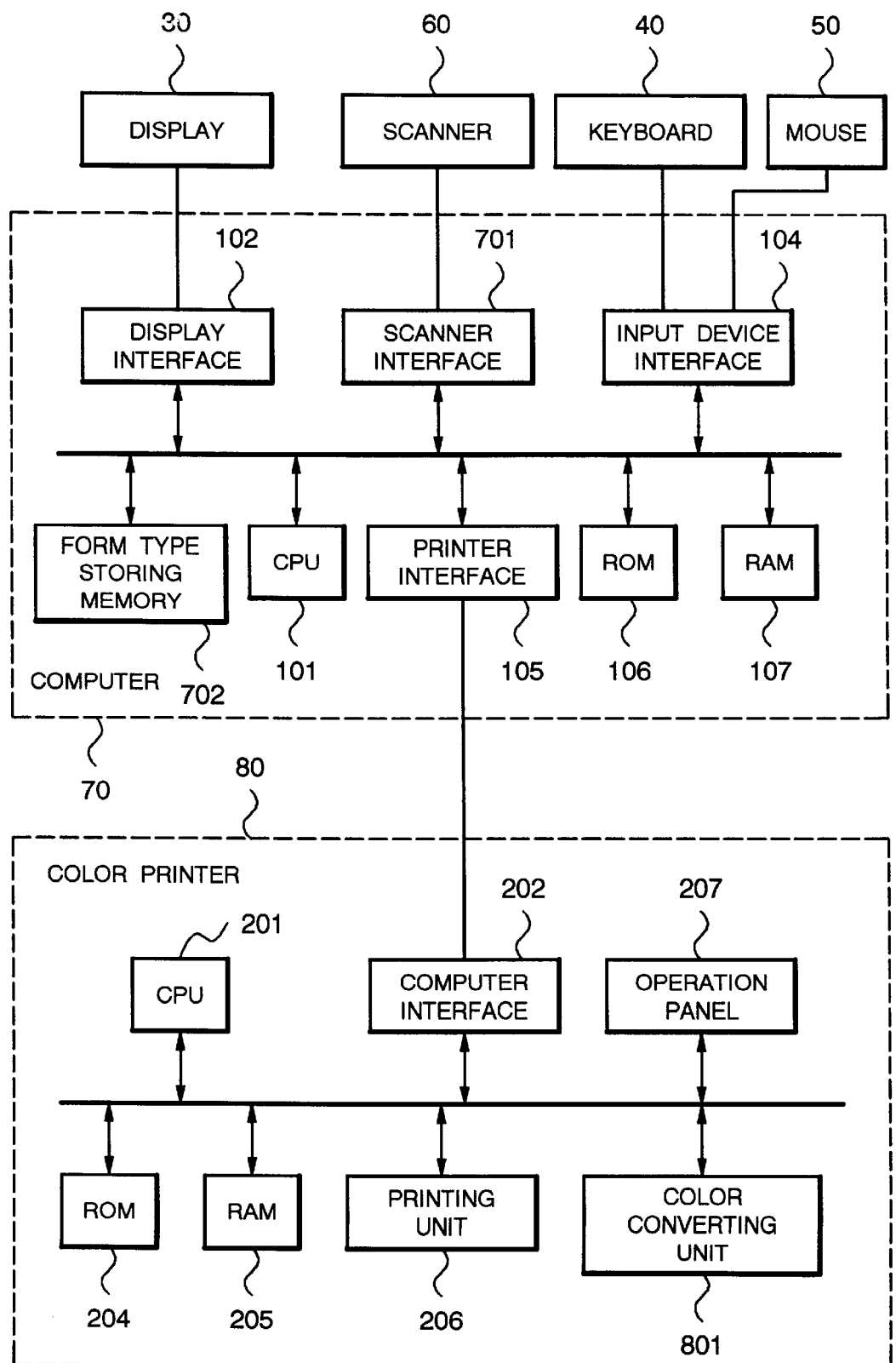
FIG. 5 is a block diagram showing the structure of a color printer system according to another embodiment of the present invention.

FIG. 5 is a block diagram showing the structure of a color printer system according to another embodiment of the present invention. With reference to FIG. 5, the color printer system of the embodiment comprises a computer 70 for controlling the whole, a color printer 80 for printing out an image object, a display 30 for displaying an image object, a keyboard 40 and a mouse 50 for entering various data and commands, and a scanner 60 for acquiring color characteristic of a paper. FIG. 5 shows only the characteristic components of the embodiment, and the description of the other general components is omitted there.

The computer 70 comprises a processor (CPU) 101 for controlling the operation of the system, a display interface 102 connected to the processor 101 through a data bus and a control bus, an input device interface 104, a printer interface 105, a read-only memory (ROM) 106 and a random-access memory (RAM) 107 for storing programs and data, a scanner interface 701, and a paper type storing memory 702.

The processor 101 is connected to the respective peripheral units through the various interfaces 102, 104, 105, and 701. The scanner 60 scans a paper and obtains the color characteristic of the paper depending on the necessity. The obtained information on the paper color characteristic is stored in the paper type storing memory 702. The paper type storing memory 702 may have the physical structure in common with the RAM 107.

The color printer 20 comprises a processor (CPU) 201 for controlling printing operation, a computer interface 202 connected to the processor 201 through a data bus and a control bus, a ROM 204 and a RAM 205 for storing programs and data, an printing unit 206 for executing printing on a paper, an operation panel 207 for performing necessary setting, and a color converting circuit 801.

The color converting unit 801 has the same function as the color converting unit 103 mounted on the computer 10 shown in FIG. 2, so to perform the color conversion processing on the color signals of an image object with consideration for the color characteristic of a device and the color characteristic of a paper. The color conversion (correcting) processing with consideration for the color characteristic of a paper is performed by use of the color characteristic information read out by the scanner 60 or stored in the paper type storing memory 702.

Since the other components are similar to the respective components of the first embodiment shown in FIG. 2, the description is omitted with the identical reference numerals attached thereto. In FIG. 5, the display 30 corresponds to the display unit 11 shown in FIG. 1, the scanner 60 corresponds to the paper color characteristic reading unit 12 shown in FIG. 1, the color converting unit 801 corresponds to the color converting unit 13 shown in FIG. 1, and the color printer 20, the printing unit 206 corresponds to the printing unit 14 shown in FIG. 1.

Figure 6:
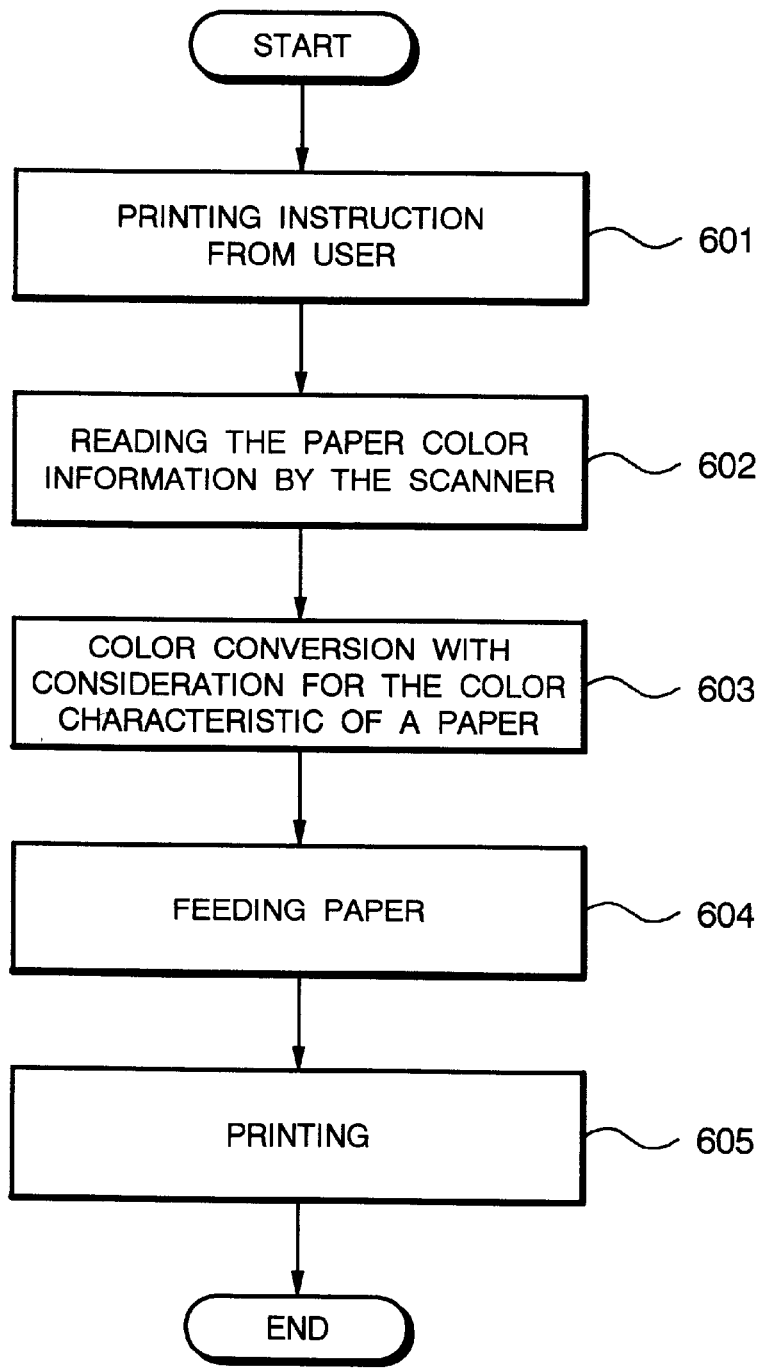
FIG. 6 is a flow chart showing the operation of the embodiment.

This time, the operation of the embodiment will be described with reference to the flow chart of FIG. 6. With reference to FIG. 6, a user operates the keyboard 40 or the mouse 50, so as to enter a printing instruction of a color image object displayed on the display 30 (Step 601). According to the instruction, the processor 101 of the computer 10 displays an instruction of selecting paper type on the display 30. When any paper type is not stored in the paper type storing memory 702, a reading instruction of the paper color characteristic information is displayed on the display 30. According to this instruction, a user sets a paper in the scanner 60 so as to read the paper color characteristic information. When the paper type of a paper intended to be used for printing is not included in the paper types stored in the paper type storing memory 702, in other words, the paper types displayed on the display 30 together with the selecting instruction, a reading instruction of the paper color characteristic information is performed in the same procedure. The paper color characteristic information read out with the scanner 60 is stored in the paper type storing memory 702 together with the paper type defined by a user (Step 602).

After reading out the color characteristic information of a desired paper from the paper type storing memory 702, or after getting the color characteristic information of a paper intended to be used for printing with the scanner 60, the processor 101 of the computer 10 sends the color characteristic of the display 30, the color characteristic of the color printer 20, and the color characteristic of the paper to the color printer 20 through the printer interface 105. The processor 201 of the color printer 20 performs the color conversion processing including color correction depending on the color characteristic of the paper, by use of the received color characteristic information, through the control of the color converting circuit 801 (Step 603). When receiving the printing data thus obtained through the color correction, the processor 201 controls the printing unit 206 so as to feed the paper (Step 604) and executes printing on the paper based on the same printing data (Step 605).

Since the color characteristic information of the paper having been once read out by the scanner 60 is being stored in the paper type storing memory 702 together with the paper type defined by a user, in the next printing by use of a paper of the same type, only selecting the stored paper type enables the printing properly processed through color conversion without input of the color characteristic of a paper by use of the scanner 60.

The color converting circuit 801 may be provided in the computer 10, not in the color printer 20. In this case, the computer 10 performs the color conversion processing and the corrected printing data as the result is delivered to the color printer 20 so to execute printing.

As set forth hereinabove, the color printer system of the present invention is capable of executing color printing of a proper hue even in case of printing on a paper of any color, by the color conversion processing of an image object depending on the color characteristic of a paper.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A color printer system for executing color printing of a color image object on various kinds of papers, comprising:
    paper color characteristic reading means for detecting color characteristic of a printing surface of a paper used in printing;
    color converting means for performing color conversion processing of said color image object according to said color characteristic of said paper obtained by said paper color characteristic reading means; and
    printing means for performing color printing on said paper based on said color image object processed by the conversion of said color converting means;
    wherein said color characteristic means performs the color conversion processing of the color image object based on said color characteristic of said paper and color characteristic of said printing means.

2. A color printer system as set forth in claim 1, further comprising
    color characteristic information storing means for storing information on the color characteristic of the paper obtained by said paper color characteristic reading means,
    wherein said color converting means performs the color conversion processing of the color image object by use of the color characteristic information read out from said color characteristic information storing means when the color characteristic of a printing surface of a paper to be used in printing is stored in said color characteristic information storing means.

3. A color printer system as set forth in claim 1, further comprising
    color characteristic information storing means for storing information on the color characteristic of the paper obtained by said paper color characteristic reading means,
    wherein said color converting means reads out information from said color characteristic information storing means when said color characteristic of a printing surface of said paper to be used in printing is stored in said color characteristic information storing means, and performs said color conversion processing of the color image object by using the color characteristic information and color characteristic of said printing means.

4. A color printer system as set forth in claim 1, wherein
    said paper color characteristic reading means comprises an optical sensor for detecting said color characteristic by receiving the reflection of a light irradiated on said paper.

5. A color printer system as set forth in claim 1, further comprising
    color characteristic information storing means for storing information on said color characteristic of said paper obtained by said paper color characteristic reading means,
    wherein said paper color characteristic reading means comprises an optical sensor for detecting said color characteristic by receiving the reflection of a light irradiated on said paper, and
    said color converting means performs the color converting processing of said color image object by use of said color characteristic information read out from said color characteristic information storing means when the color characteristic of a printing surface of a paper to be used in printing is stored in said color characteristic information storage means.

6. A color printer system as set forth in claim 1, wherein
    said paper color characteristic reading means comprises a scanner for optically scanning a printing surface of said paper.

7. A color printer system as set forth in claim 1, further comprising
    color characteristic information storing means for storing information on said color characteristic of said paper obtained by said paper color characteristic reading means,
    wherein said paper color characteristic reading means comprises a scanner for optically scanning a printing surface of a paper, and
    said color converting means performs said color conversion processing of said color image object by use of said color characteristic information read out from said color characteristic information storing means when said color characteristic of a printing surface of a paper to be used in printing is stored in said color characteristic information storing means.

8. A color printer system for executing color printing of a color image object on various kinds of papers, comprising:

a paper color characteristic reading unit that detects color characteristic of a printing surface of a paper used in printing;

a color converting unit that performs color conversion processing of said color image object according to said color characteristic of said paper obtained by said paper color characteristic reading unit; and a printing unit that performs color printing on said paper based on said color image object processed by the conversion of said color converting unit wherein said color characteristic unit performs the color conversion processing of the color image object based on said color characteristic of said paper and color characteristic of said printing unit.

9. A color printer system as set forth in claim 8, further comprising:

a color characteristic information storage unit that stores color characteristic information on the color characteristic of the paper obtained by said paper color characteristic reading unit, wherein said color converting unit performs the color conversion processing of the color image object by use of the color characteristic information read out from said color characteristic information storage unit when the color characteristic of a printing surface of a paper to be used in printing is stored in said color characteristic information storage unit.

10. A color printer system as set forth in claim 8, further comprising:

a color characteristic information storage unit that stores information on the color characteristic of the paper obtained by said paper color characteristic reading unit, wherein said color converting unit reads out information from said color characteristic information storage unit when said color characteristic of a printing surface of said paper to be used in printing is stored in said color characteristic information storage unit, and performs said color conversion processing of the color image object by using the color characteristic information and color characteristic of said printing unit.

11. A color printer system as set forth in claim 8, wherein said paper color characteristic reading unit comprises an optical sensor for detecting said color characteristic by receiving the reflection of a light irradiated on said paper.

12. A color printer system as set forth in claim 8, further comprising:

a color characteristic information storage unit that stores information on said color characteristic of said paper obtained by said paper color characteristic reading unit, wherein said paper color characteristic reading unit comprises an optical sensor for detecting said color characteristic by receiving the reflection of a light irradiated on said paper, and said color converting unit performs the color conversion processing of said color image object by use of said color characteristic information read out from said color characteristic information storage unit when the color characteristic of a printing surface of a paper to be used in printing is stored in said color characteristic information storage unit.

13. A color printer system as set forth in claim 8, wherein said paper color characteristic reading unit comprises a scanner that optically scans a printing surface of said paper.

14. A color printer system as set forth in claim 8, further comprising:

a color characteristic information storage unit that stores information on said color characteristic of said paper obtained by said paper color characteristic reading unit, wherein said paper color characteristic reading unit comprises a scanner that optically scans a printing surface of said paper, and said color converting unit performs said color conversion processing of said color image object by use of said color characteristic information read out from said color characteristic information storage unit when said color characteristic of a printing surface of a paper to be used in printing is stored in said color characteristic information storage unit.

* * * * *